United States Patent
Zhu et al.

(10) Patent No.: US 12,339,255 B1
(45) Date of Patent: Jun. 24, 2025

(54) ENERGY ABSORBING AND BUFFERING DEVICE APPLIED TO DYNAMIC TRUE TRIAXIAL ELECTROMAGNETIC HOPKINSON BAR AND METHOD

(71) Applicant: Shenzhen University, Shenzhen (CN)

(72) Inventors: Jianbo Zhu, Shenzhen (CN); Chengcheng Xie, Shenzhen (CN); Tao Zhou, Shenzhen (CN); Weiyue Bao, Shenzhen (CN); Shiwei Zhang, Shenzhen (CN); Zhuo Cen, Shenzhen (CN); Junyan Li, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 18/959,450

(22) Filed: Nov. 25, 2024

(30) Foreign Application Priority Data

Dec. 22, 2023 (CN) .......................... 202311775193.3

(51) Int. Cl.
*G01N 3/02* (2006.01)
*G01N 3/317* (2006.01)

(52) U.S. Cl.
CPC ............... *G01N 3/02* (2013.01); *G01N 3/317* (2013.01); *G01N 2203/0098* (2013.01); *G01N 2203/0256* (2013.01); *G01N 2203/0441* (2013.01)

(58) Field of Classification Search
CPC .. G01N 3/02; G01N 3/317; G01N 2203/0098; G01N 2203/0256; G01N 2203/0441; G01N 3/18; F16C 19/10; F16C 35/06; F16C 2240/06

USPC .................................................... 73/855, 784
See application file for complete search history.

(56) References Cited

U.S. PATENT DOCUMENTS

| | | | |
|---|---|---|---|
| 2021/0318216 A1 | 10/2021 | Zhu | |
| 2022/0128442 A1* | 4/2022 | Zhou | .................... G01N 3/317 |

FOREIGN PATENT DOCUMENTS

| | | | | |
|---|---|---|---|---|
| CN | 202101910 U | * | 1/2012 | |
| CN | 203230657 U | | 10/2013 | |
| CN | 104535409 A | * | 4/2015 | ............... G01N 3/00 |
| CN | 105806698 A | | 7/2016 | |
| CN | 107740841 A | | 2/2018 | |
| CN | 207842949 U | | 9/2018 | |
| CN | 108860206 A | | 11/2018 | |
| CN | 109323937 B | | 2/2019 | |
| CN | 110057696 B | | 7/2019 | |
| CN | 111044350 B | | 4/2020 | |
| CN | 111572587 B | | 8/2020 | |
| CN | 114396838 B | | 4/2022 | |

* cited by examiner

*Primary Examiner* — Brandi N Hopkins
(74) *Attorney, Agent, or Firm* — Birchwood IP

(57) ABSTRACT

Provided are an energy absorbing and buffering device applied to a dynamic true triaxial electromagnetic Hopkinson bar and a testing and using method thereof. The device comprises an energy absorbing and buffering ring, an exhaust pipe and an inert gas storage bin. According to the testing and using method, the energy absorbing and buffering device is utilized and connected with a waveguide bar through a middle hollow structure; and a rear end of the energy absorbing and buffering ring is tightly attached to a baffle at a confining pressure loading end. The energy absorbing and buffering device provides energy absorbing and buffering for the waveguide bar, which prolongs a service life of the waveguide bar under an impact load.

10 Claims, 13 Drawing Sheets

ENERGY ABSORBING AND BUFFERING DEVICE APPLIED TO DYNAMIC TRUE TRIAXIAL ELECTROMAGNETIC HOPKINSON BAR AND METHOD

CROSS-REFERENCE TO RELATED APPLICATIONS

This application claims priority to Chinese Patent Application No. 202311775193.3, filed on Dec. 22, 2023, which is hereby incorporated by reference in its entirety.

TECHNICAL FIELD

The present invention relates to the field of high-end equipment manufacturing, in particular to an energy absorbing and buffering device applied to a dynamic true triaxial electromagnetic Hopkinson bar and a testing and using method thereof.

BACKGROUND

Research on dynamic mechanical response of brittle solid materials such as rocks and concrete under the condition of medium and high strain rates ($101s-1$ to $103s-1$) is generally carried out by using a split Hopkinson bar. The present invention with the patent No. US20210318216A1 provides a dynamic true triaxial electromagnetic Hopkinson bar system and a testing method, which can apply synchronous dynamic stress waves to six incident bars synchronously in three axes and six directions, and an arrival error of the six stress waves is guaranteed within 5 μs. True triaxial static load can be applied in three axial directions while the stress waves are applied, so as to realize three-axis and six-direction synchronous dynamic impact under the true triaxial static load. However, this dynamic true triaxial electromagnetic Hopkinson bar testing system is different from a traditional pneumatic Hopkinson bar which has an absorbing bar as an energy absorbing system, and the dynamic true triaxial electromagnetic Hopkinson bar testing system has no device as an energy absorbing system, so that transmitted impact energy can only be borne by the waveguide bar, and a part structure of the waveguide bar will be damaged under repeated impacts. Therefore, it is necessary to add an energy absorbing and buffering device to the bar of the existing dynamic true triaxial electromagnetic Hopkinson bar system to prevent the six incident bars from being greatly damaged under repeated dynamic loads in a short time and prolong a service life of the waveguide bar.

SUMMARY

In order to solve the problems in the prior art, the present invention provides an energy absorbing and buffering device applied to a dynamic true triaxial electromagnetic Hopkinson bar, which comprises an energy absorbing and buffering ring, an exhaust pipe and an inert gas storage bin, wherein the exhaust pipe is connected with the energy absorbing and buffering ring and the inert gas storage bin;

the energy absorbing and buffering ring comprises: a collided impact ring, an inert gas impact ring outer wall, an annular connecting bar, an annular piston, an intra-annular air vessel and an intra-annular air hole; and the collided impact ring slides relative to the inert gas impact ring outer wall, interiors of the collided impact ring and the inert gas impact ring outer wall are designed as hollow structures, the collided impact ring is fixedly connected with the annular piston through the annular connecting bar, the inert gas impact ring outer wall and a bottom end of the annular piston form the intra-annular air vessel, and the intra-annular air hole is arranged on the intra-annular air vessel; and the inert gas storage bin is provided with an upper partition plate and a lower partition plate; the upper partition plate and the lower partition plate are arranged in the inert gas storage bin to divide the inert gas storage bin into an upper air vessel and a lower air vessel, the inert gas storage bin is further provided with an air inlet of the inert gas storage bin, and the air inlet of the inert gas storage bin is communicated with the upper air vessel; the upper partition plate and the lower partition plate are respectively provided with balance air holes, a piston is arranged between the upper partition plate and the lower partition plate, the piston is provided with a piston exhaust hole; and after the piston exhaust hole is communicated with the balance air holes of the upper partition plate and the lower partition plate, the upper air vessel is communicated with the lower air vessel; and one end of the upper partition plate is provided with an air leakage hole, the piston between the upper partition plate and the lower partition plate is arranged close to the air leakage hole, and one end of the piston far from the air leakage hole is provided with a spring.

As a further improvement of the present invention, the piston comprises a holeless piston and a perforated piston, the perforated piston is provided with a piston exhaust hole, one end of the perforated piston is connected with the spring, and the other end of the perforated piston is connected with the holeless piston through a piston connecting bar.

As a further improvement of the present invention, the energy absorbing and buffering ring further comprises an energy absorbing and buffering material, the energy absorbing and buffering material is arranged on the inert gas impact ring outer wall, and when the collided impact ring moves, the energy absorbing and buffering material is tightly contacted with the collided impact ring to slow down the movement of the collided impact ring.

As a further improvement of the present invention, the hollow structures inside the collided impact ring and the inert gas impact ring outer wall are square holes.

As a further improvement of the present invention, the inert gas is nitrogen.

As a further improvement of the present invention, the energy absorbing and buffering material is made of rubber or resin material.

A testing and using method of an energy absorbing and buffering device applied to a dynamic true triaxial electromagnetic Hopkinson bar utilizes the energy absorbing and buffering device mentioned above, wherein the energy absorbing and buffering device is connected with the waveguide bar through the middle hollow structure; the collided impact ring is tightly attached to a boss part of the waveguide bar, positions of the waveguide bar and the energy absorbing and buffering ring are adjusted until the rear end of the energy absorbing and buffering ring is tightly attached to the baffle at the confining pressure loading end, the position at the moment is best, and the energy absorbing and buffering ring is connected with the inert gas storage bin through the exhaust pipe; after mounting, a test is started, and an expected result is as follows: an electromagnetic gun inputs a stress wave into the waveguide bar through a front-end amplifier, and a reflected wave is formed when the incident wave reaches a sample boundary surface, when the reflected wave and an opposite transmitted wave reach the boss part of the waveguide bar, the boss collides the collided impact ring of the energy absorbing and buffering ring, and the collided impact ring drives the piston connecting bar and the piston part to move towards the air vessel to compress the inert gas, and discharge the compressed inert gas from the exhaust hole, the inert gas enters the external inert gas storage bin through the exhaust pipe, the inert gas storage bin is divided into two air vessels by the partition plate, the compressed inert gas first enters the upper air vessel to push a spring-piston mechanism to move until the exhaust hole reaches the position of the balance air hole, and the gas diffuses to the lower air vessel through the exhaust hole to reduce a pressure in the upper air vessel, and the spring-piston mechanism begins to reset, thus ensuring that the inert gas in the inert gas energy absorbing and buffering ring has a certain capacity.

As a further improvement of the present invention, after one-time use, the inert gas in the external inert gas storage bin is refilled into the gas vessel for reuse.

As a further improvement of the present invention, air pressures of the inert gas storage bin and the lower air vessel in the inert gas storage bin are ensured to be equal at the same time, and erection of the energy absorbing and buffering device is completed at the moment.

As a further improvement of the present invention, an end surface of the energy absorbing and buffering ring is tightly attached to an end surface of an outer protective frame of an electromagnetic pulse gun.

The present invention has the beneficial effects that:

There are no other components at the rear end of the transmission bar in the traditional pneumatic Hopkinson bar system, so one absorbing bar can be arranged behind the transmission bar as an energy absorbing and buffering device. However, in the dynamic true triaxial electromagnetic Hopkinson bar testing system, due to the multi-axis and multi-directional synchronous incidence, the six waveguide bars are used as the incident bars at the same time; when loading, the waveguide bars need to be in direct contact with the electromagnetic pulse gun, and no additional components can be added between the waveguide bars and the electromagnetic pulse gun. As a result, a traditional one-dimensional Hopkinson bar device using the method of adopting the absorbing bar as the energy absorbing and buffering device cannot be applied to the testing system. Meanwhile, the dynamic true triaxial electromagnetic Hopkinson bar testing system has the function of dynamic and static combined loading, and the static load thereof is realized by setting the boss structure on the waveguide bar. Under dynamic impact, the boss structure of the waveguide bar has the problem of impact shear failure, so it is necessary to reduce damage of the boss structure during loading.

Therefore, considering the special structure of the waveguide bar in the dynamic true triaxial electromagnetic Hopkinson bar testing system, the energy absorbing and buffering device using inert gas (such as nitrogen, and preferably nitrogen) as an energy absorbing medium is designed, which can play a buffer protection role for the waveguide bar with the special structure in the dynamic true triaxial electromagnetic Hopkinson bar testing system.

The energy absorbing and buffering device in this application (for example, set in an annular shape) in the present invention can provide energy absorbing and buffering function for the waveguide bar and prolong a service life of the boss end of the waveguide bar under impact load.

Compared with the traditional Hopkinson bar which uses the absorbing bar as the energy absorbing and buffering device, the design uses gas as the energy absorbing and buffering medium to reduce noise caused by collision.

The single perforated piston may have the problem of air leakage because the piston is not in close contact with the upper and lower partition plates. The structure of two pistons is used, and one holeless piston is arranged in front of the perforated piston to enhance air tightness and prevent air leakage.

Figure 1:
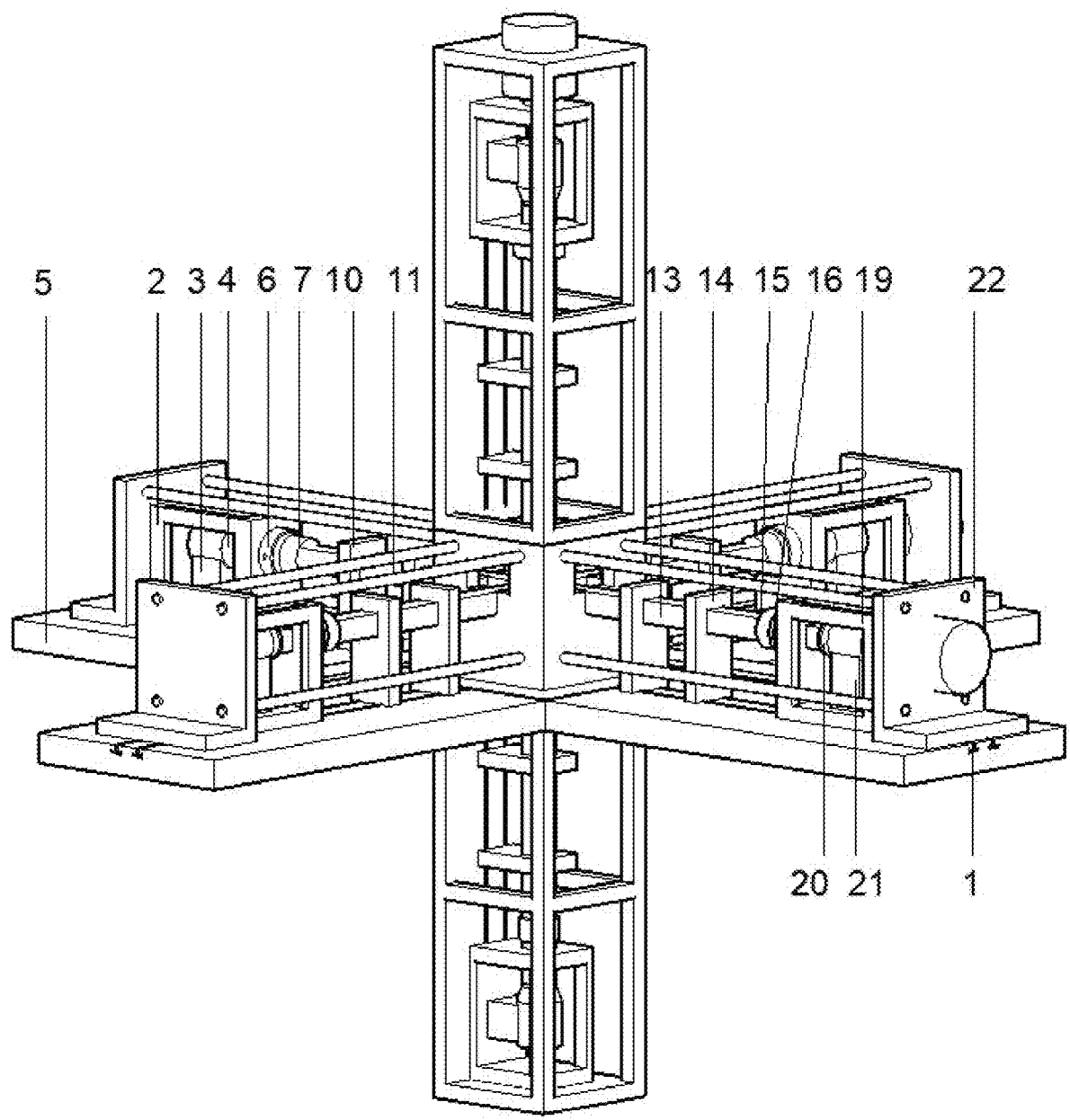
FIG. 1 is a three-dimensional diagram of a dynamic true triaxial electromagnetic Hopkinson bar system in the prior art.

Names of corresponding components in the drawing are as follows: 1 refers to X axial auxiliary slide rail, 2 refers to outer protective frame of X+ direction electromagnetic pulse gun, 3 refers to X+ direction electromagnetic pulse gun supporting base, 4 refers to X+ direction electromagnetic pulse gun, 5 refers to X axial supporting platform, 6 refers to X+ direction energy absorbing and buffering ring, 7 refers to X+ direction waveguide bar boss, 8 refers to X+ direction exhaust pipe, 9 refers to X+ direction inert gas storage bin, 10 refers to X+ direction waveguide bar supporting holder, 11 refers to X+ direction waveguide bar, 12 refers to sample, 13 refers to X− direction waveguide bar, 14 refers to X− direction waveguide bar supporting holder, 15 refers to X− direction waveguide bar boss, 16 refers to X− direction energy absorbing and buffering ring, 17 refers to X− direction exhaust pipe, 18 refers to X− direction inert gas storage bin, 19 refers outer protective frame of X− direction electromagnetic pulse gun, 20 refers to X− direction electromagnetic pulse gun, 21 refers to X− direction electromagnetic pulse gun supporting base, 22 refers to X axial hydraulic device, 23 refers to collided impact ring, 24 refers to inert gas impact ring outer wall, 25 refers to energy absorbing and buffering material, 26 refers to annular connecting bar, 27 refers to annular piston, 28 refers to intra-annular air vessel, 29 refers to intra-annular air hole, 30 refers to air inlet of inert gas storage bin, 31 refers to upper partition plate, 32 refers to lower partition plate, 33 refers to holeless piston, 34 refers to piston connecting bar, 35 refers to piston exhaust hole, 36 refers to perforated piston, 37 refers to spring, 38 refers to balance air hole, 39 refers to upper air vessel, and 40 refers to lower air vessel.

DESCRIPTION OF EMBODIMENTS

The present invention is further explained with reference to the drawings hereinafter.

An energy absorbing and buffering device applied to a dynamic true triaxial electromagnetic Hopkinson bar mainly consists of three parts, which are an inert gas energy absorbing and buffering ring, an exhaust pipe and an inert gas storage bin.

The energy absorbing and buffering ring comprises: a collided impact ring 23, an inert gas impact ring outer wall 24, an annular connecting bar 25, an annular piston 26, an annular piston 27, an intra-annular air vessel 28 and an intra-annular air hole 29.

The inert gas storage bin comprises: an air inlet of the inert gas storage bin 30, an upper partition plate 31, a lower partition plate 32, a holeless piston 33, a piston connecting bar 34, a piston exhaust hole 35, a perforated piston 36, a spring 37, a balance air hole 38, an upper air vessel 39 and a lower air vessel 40.

Figure 2A:
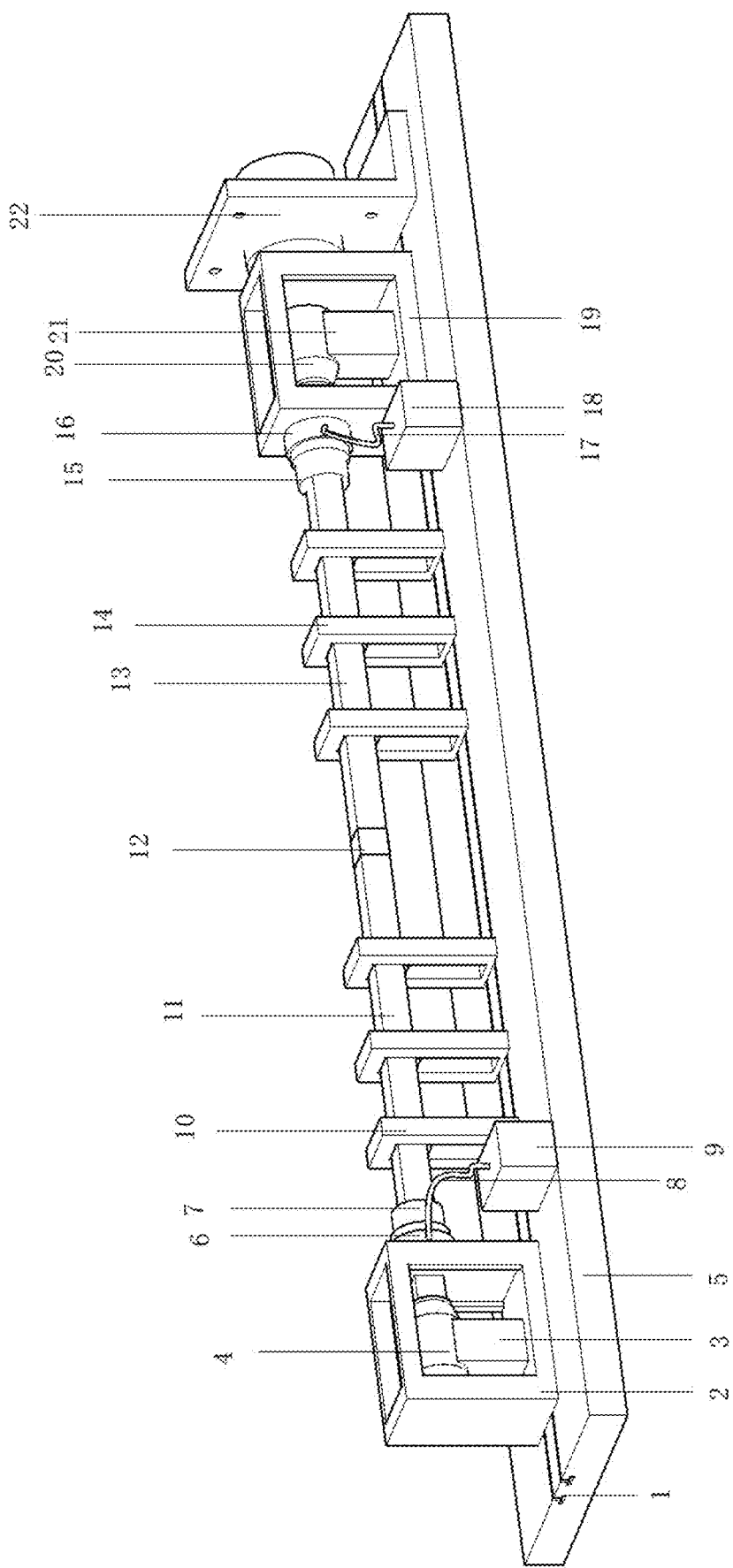
FIG. 2A is a three-dimensional diagram of a dynamic true triaxial electromagnetic Hopkinson bar system with an inert gas energy absorbing and buffering device (taking an X direction as an example)
Figure 2B:
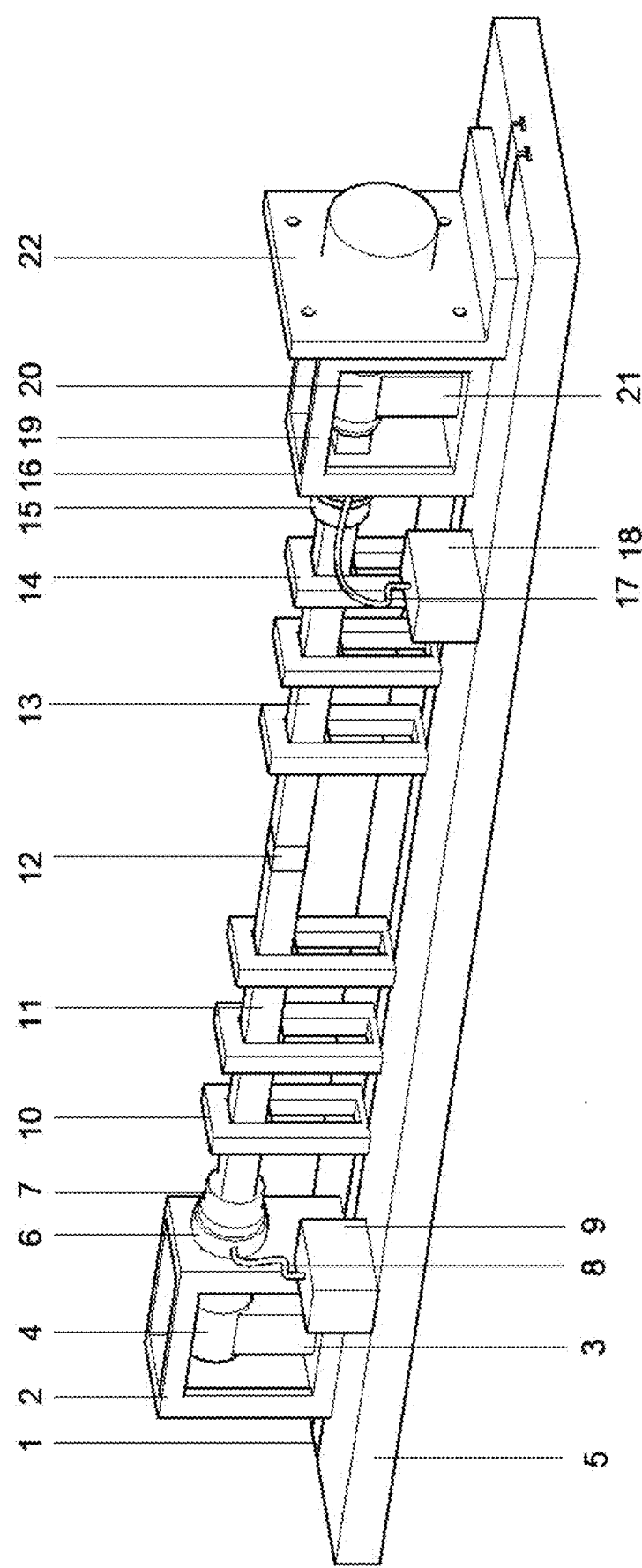
FIG. 2B is a three-dimensional diagram of the dynamic true triaxial electromagnetic Hopkinson bar system with an inert gas energy absorbing and buffering device from another angle (taking the X direction as an example)
Figure 3:
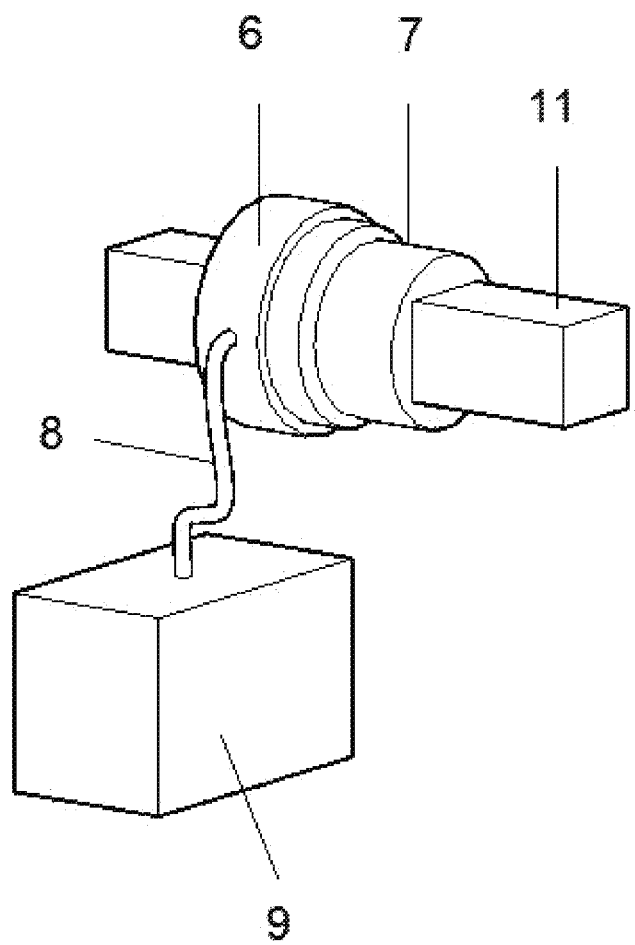
FIG. 3 is a schematic diagram of connection an X+ direction the inert gas energy absorbing and buffering device and a waveguide bar.
Figure 4:
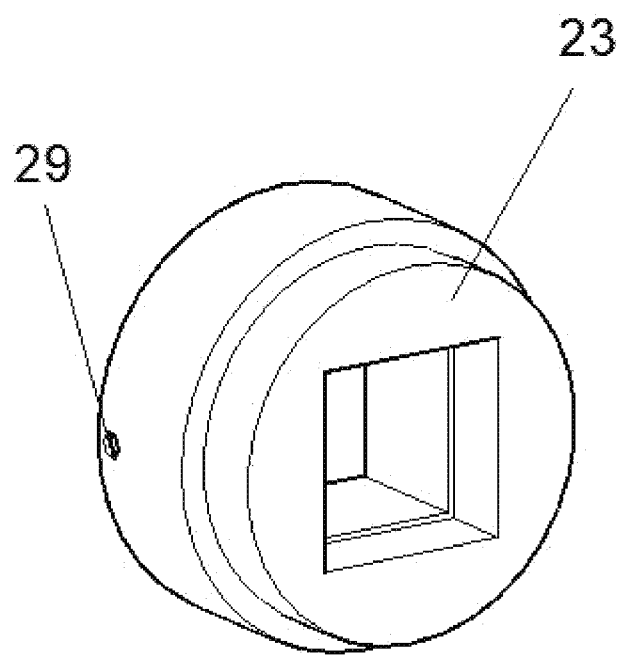
FIG. 4 is a three-dimensional diagram of an energy absorbing and buffering ring.
Figure 5:
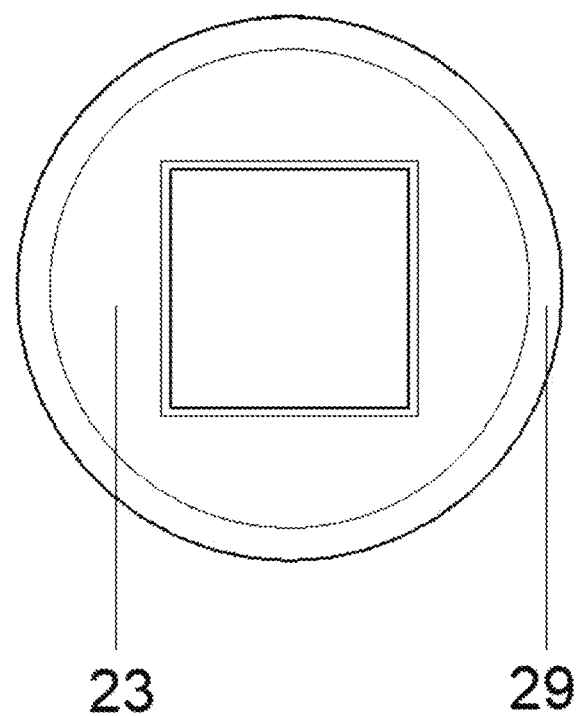
FIG. 5 is a front view of the energy absorbing and buffering ring.
Figure 6:
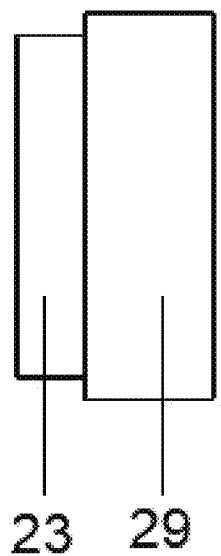
FIG. 6 is a side view of the energy absorbing and buffering ring.
Figure 7A:
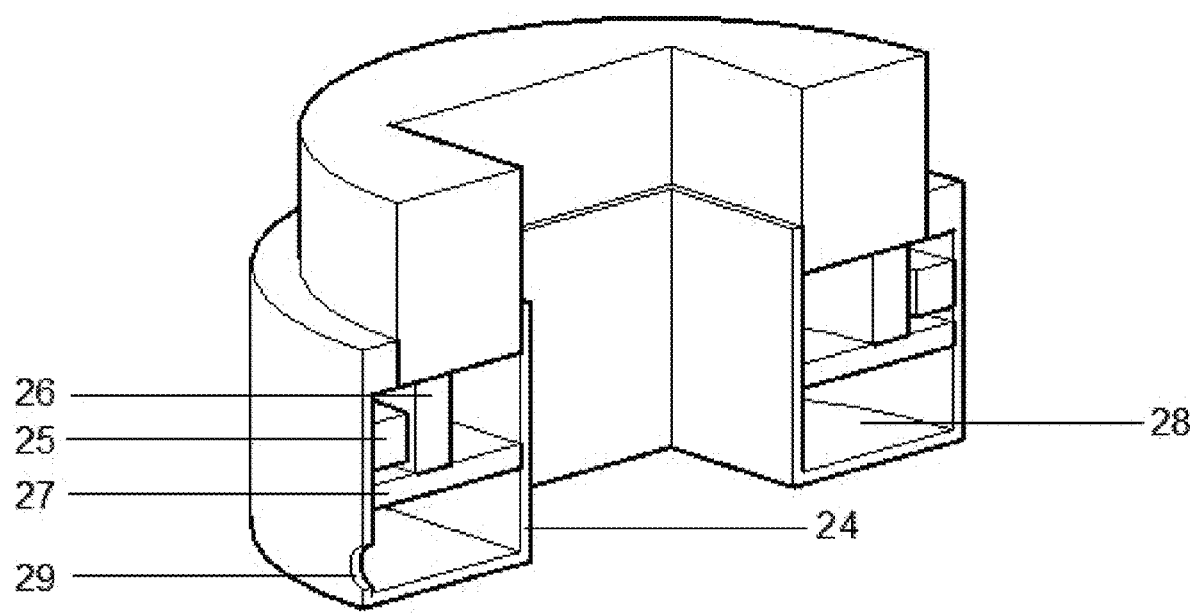
FIG. 7A is a sectional view of the energy absorbing and buffering ring.
Figure 7B:
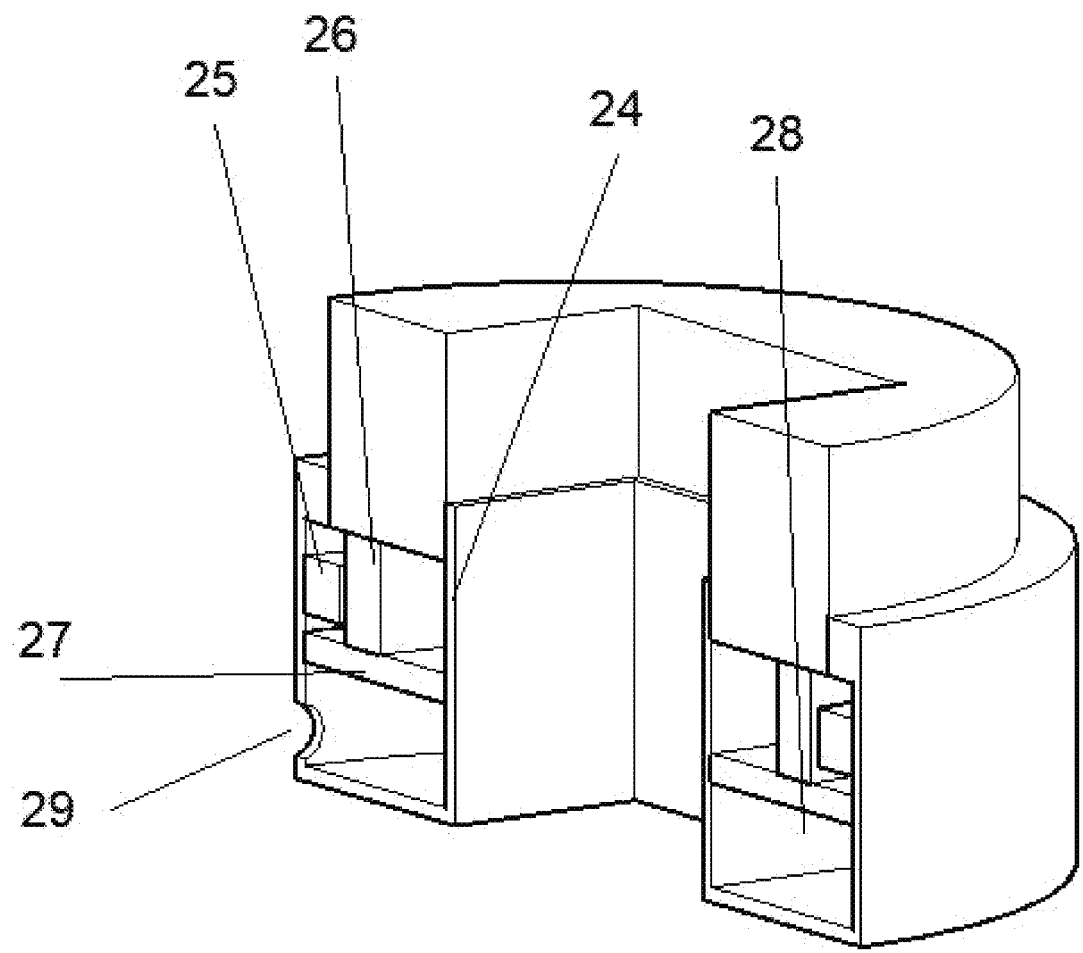
FIG. 7B is a sectional view of the energy absorbing and buffering ring from another angle.
Figure 8:
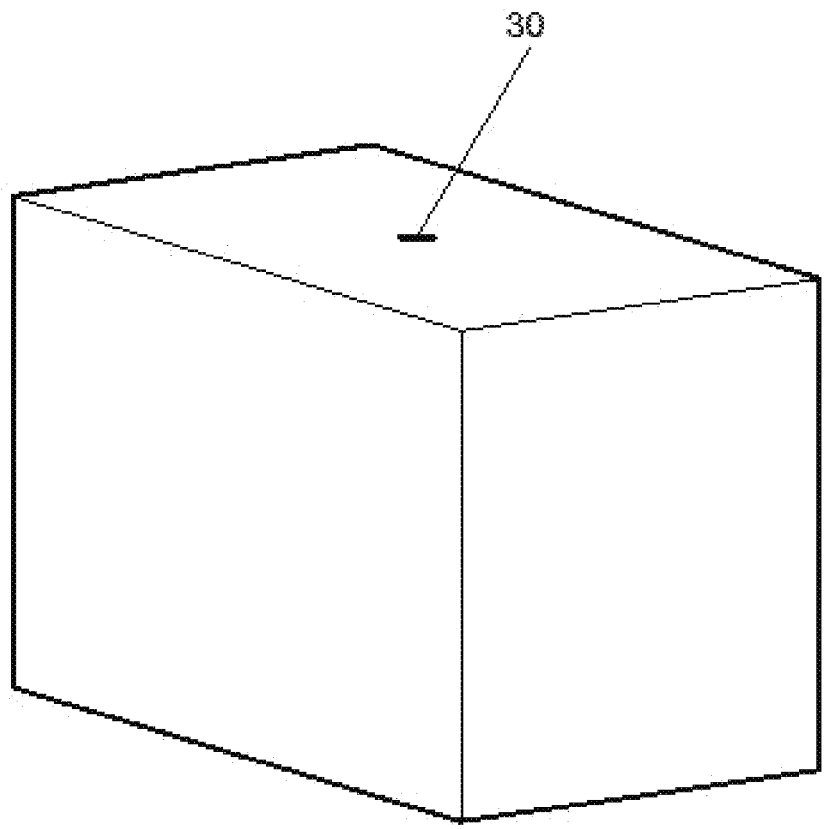
FIG. 8 is a three-dimensional diagram of an inert gas storage bin.
Figure 9A:
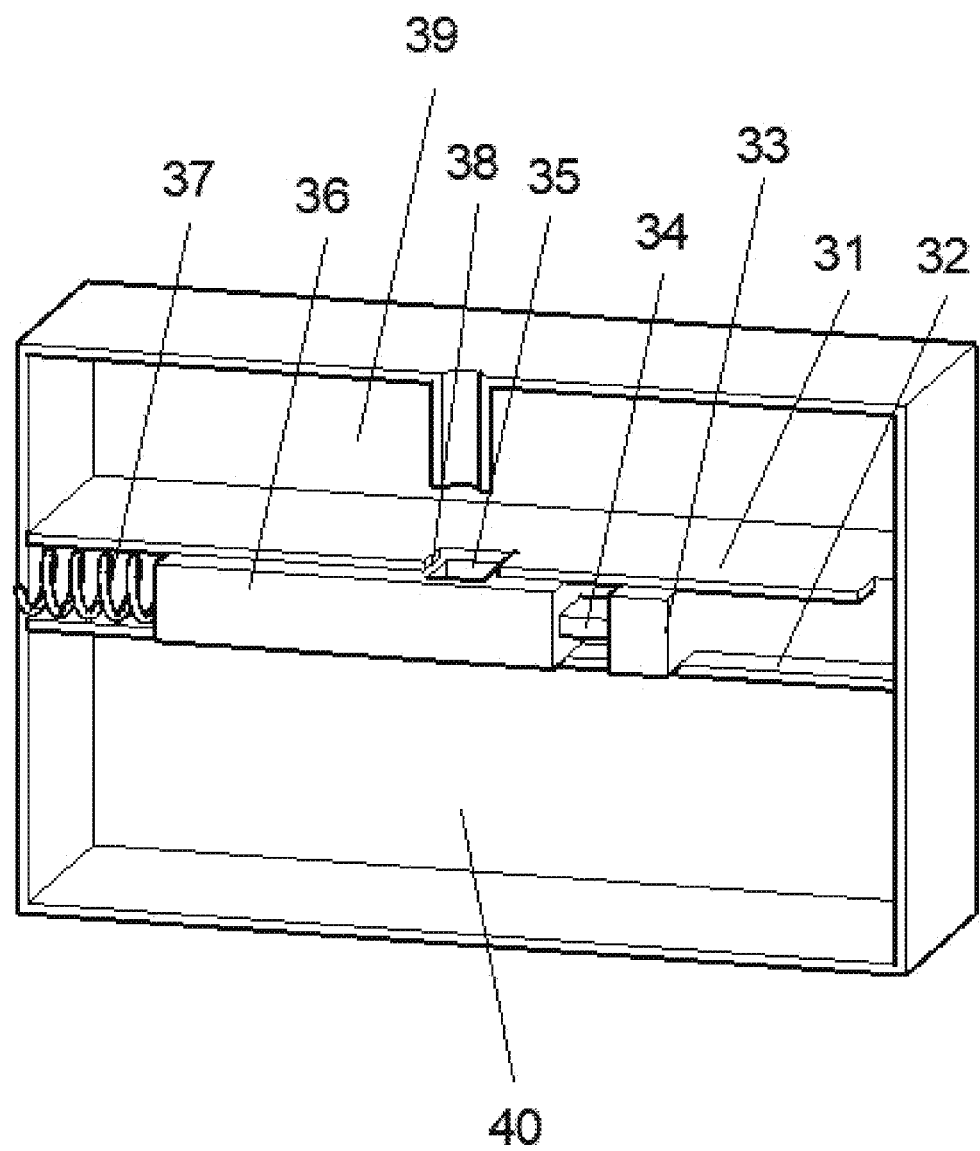
FIG. 9A is a side view of an internal structure of the inert gas storage bin, which shows that balance air holes of an upper partition plate and a lower partition plate are communicated.
Figure 9B:
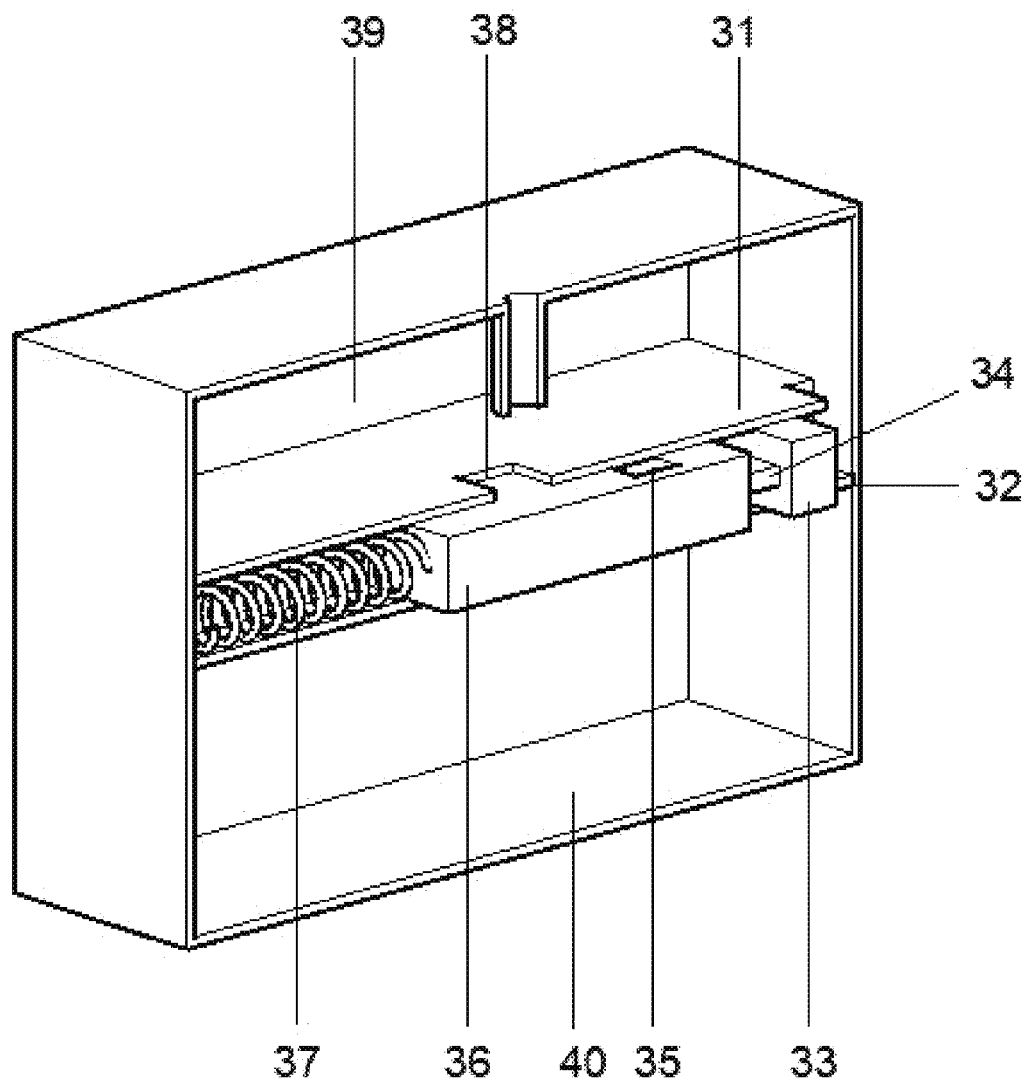
FIG. 9B is a side view of the internal structure of the inert gas storage bin, which shows that the balance air holes of an upper partition plate and a lower partition plate are not communicated.
Figure 10:
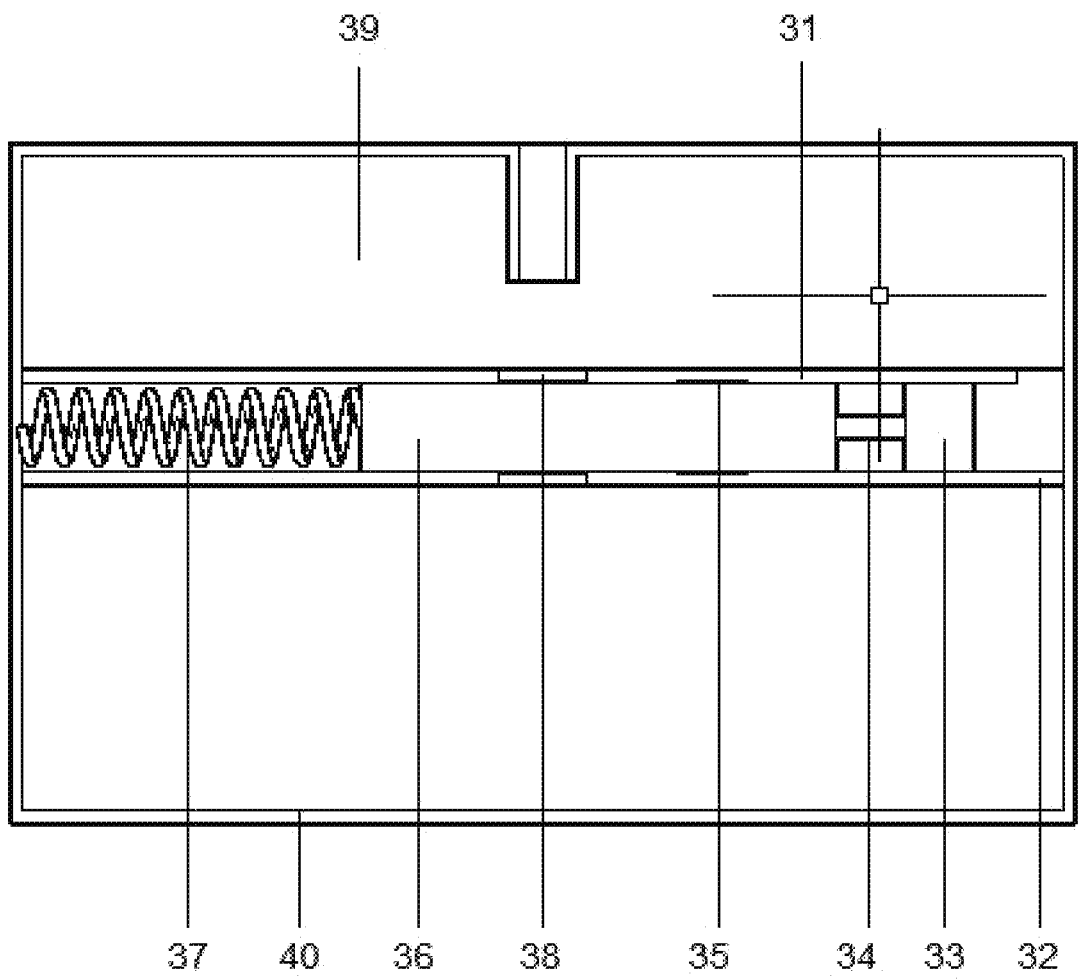
FIG. 10 is a front view of the internal structure of the inert gas storage bin.

As shown FIG. 2A and FIG. 2B, an impact test in an X+ direction is taken as an example, and the testing device is placed on an X axial supporting platform 5. During testing, an X+ direction energy absorbing and buffering ring 6 and an X− direction energy absorbing and buffering ring 16 are respectively connected with an X+ direction waveguide bar 11 and an X− direction waveguide bar 13 through respective central square holes thereof, and positions of the energy absorbing and buffering ring and the waveguide bar are adjusted so that the X+ direction energy absorbing and buffering ring 6 and the X− direction energy absorbing and buffering ring 16 are tightly attached to boss parts of the X+ direction waveguide bar 11 and the X− direction waveguide bar 13 respectively. After that, an X axial hydraulic device 22 is operated to ensure that front end surfaces of the X+ direction energy absorbing and buffering ring 6 and the X− direction energy absorbing and buffering ring 16 are tightly attached to rear end surfaces of an outer protective frame 2 of the X+ direction electromagnetic pulse gun 2 and an outer protective frame 19 of the X− direction electromagnetic pulse gun respectively, and to ensure that air pressures of the upper air vessel 39 and the lower air vessel 40 in the inert gas (such as nitrogen) storage bin are equal. At this time, the erection of the energy absorbing and buffering device is completed, and a sample 12 is placed between the X+ direction waveguide bar 11 and the X− direction waveguide bar 13. Then, the X axial hydraulic device 22 is operated to ensure that the end surfaces of the X+ direction waveguide bar 11 and the X− direction waveguide bar 13 are tightly attached to an end surface of the sample 12, and an X+ direction waveguide bar supporting holder 10 and an X− direction waveguide bar supporting holder 14 are adjusted to ensure the levelling of the bars, and then loading is started. An X+ direction electromagnetic pulse gun 4 and an X− direction electromagnetic pulse gun 20 emit stress waves to the X+ direction waveguide bar 11 and the X− direction waveguide bar 13 respectively. When the stress waves reach an interface between the waveguide bar and the sample via the waveguide bar, transmission and reflection are generated, and a transmitted wave from an opposite incident wave and a reflected wave generated by an incident wave in the direction are superimposed and then propagated along the waveguide bar towards the electromagnetic pulse gun. When the superimposed stress waves propagate to an X+ direction waveguide bar boss 7 and an X− direction waveguide bar boss 15 along the X+ direction waveguide bar 11 and the X− direction waveguide bar 13 respectively, the X+ direction waveguide bar boss 7 and the X− direction waveguide bar boss 15 are tightly attached to the X+ direction energy absorbing and buffering ring 6 and the X− direction energy absorbing and buffering ring 16, the movement of the X+ direction waveguide bar boss 7 and the X− direction waveguide bar boss 15 will make the X+ direction energy absorbing and buffering ring 6 and the X− direction energy absorbing and buffering ring 16 act. Internal functions of the X+ direction energy absorbing and buffering ring 6 and the X− direction energy absorbing and buffering ring 16 are as follows: the collided impact ring 23 is impacted by the backward movement of the boss and moves in the direction of the intra-annular air vessel 28. The energy absorbing and buffering material 25 is made of rubber or resin material, which plays a role in regulating and slowing down the movement of the collided impact ring 23 and prevents the collided impact ring 23 from moving too fast to damage the structure thereof. The collided impact ring 23 pushes the annular piston 27 through the annular connecting bar 26 to compress the inert gas in the intra-annular air vessel 28, and the gas in the intra-annular air vessel 28 is discharged into the inert gas storage bin through the intra-annular air hole 29 in a compression stroke, and the gas enters the upper air vessel 39 through the exhaust pipe, so that the air pressure in the upper air vessel 39 is increased to push the holeless piston 33 to be compressed towards the end of the spring 37 until the piston exhaust hole 35 is pushed to the balance air hole 38. In this case, there is a pressure difference between the upper air vessel 39 and the lower air vessel 40, and the gas in the upper air vessel 39 diffuses to the lower air vessel 40 under the action of the pressure difference, so as to ensure the air tightness between the upper partition plate 31 and the lower partition plate 32 and various components, so that the gas does not diffuse except to the balance air holes 38. In this process, part of kinetic energy propagated by the stress waves in the bar is converted into gas heat energy and frictional heat energy for dissipation to reduce impact injury of the X+ direction waveguide bar 11 and the X− direction waveguide bar 13 and prolong the service lives of the waveguide bars.

A testing and using method: before testing, the c inert gas (for example, nitrogen) energy absorbing and buffering device is tightly attached to the square waveguide bar through a middle square hole, the collided impact ring 23 is tightly attached to a boss part of the waveguide bar, positions of the waveguide bar and the energy absorbing and buffering ring are adjusted until the rear end of the energy absorbing and buffering ring is tightly attached to the baffle at the confining pressure loading end, the position at the moment is best, and the energy absorbing and buffering ring is connected with the inert gas storage bin through the exhaust pipe; after mounting, a test is started, and an expected result is as follows: an electromagnetic emission gun inputs a stress wave into the waveguide bar through a front-end amplifier, and a reflected wave is formed when the incident wave reaches a sample boundary surface, when the reflected wave and an opposite transmitted wave reach the boss part of the waveguide bar, the boss collides the collided impact ring 23 of the energy absorbing and buffering ring, and the collided impact ring 23 drives the annular connecting bar 26 and the piston part to move towards the air vessel to compress the inert gas, and discharge the compressed inert gas from the exhaust hole, the inert gas enters the external inert gas storage bin through the exhaust pipe, the inert gas storage bin is divided into two air vessels by the partition plate, the compressed inert gas first enters the upper air vessel to push a spring-piston mechanism to move until the exhaust hole reaches the position of the balance air hole, and the gas diffuses to the lower air vessel through the exhaust hole to reduce a pressure in the upper air vessel, and the spring-piston mechanism begins to reset, thus ensuring that the inert gas in the inert gas energy absorbing and buffering ring has a certain capacity, thus ensuring that the inert gas will not quickly spread under the impact to lose the buffering effect. In the above process, the energy brought by the impact will be dissipated as energy such as heat energy, and after being used once, the inert gas in the external inert gas storage bin will be refilled into the air vessel again for reuse.

The foregoing are further detailed descriptions of the present invention with reference to the specific preferred embodiments, and it should not be considered that the embodiments of the present invention are limited to these descriptions. For those having ordinary skills in the art, some simple deduction or replacement can be made without departing from the concept of the present invention, which shall all be included within the scope of protection of the present invention.

What is claimed is:

1. An energy absorbing and buffering device applied to a dynamic true triaxial electromagnetic Hopkinson bar, comprising: an energy absorbing and buffering ring, an exhaust pipe and an inert gas storage bin, wherein the exhaust pipe is connected with the energy absorbing and buffering ring and the inert gas storage bin;
   the energy absorbing and buffering ring comprises: a collided impact ring, an inert gas impact ring outer wall, an annular connecting bar, an annular piston, an intra-annular air vessel and an intra-annular air hole; and the collided impact ring slides relative to the inert gas impact ring outer wall, interiors of the collided impact ring and the inert gas impact ring outer wall are designed as hollow structures, the collided impact ring is fixedly connected with the annular piston through the annular connecting bar, the inert gas impact ring outer wall and a bottom end of the annular piston form the intra-annular air vessel, and the intra-annular air hole is arranged on the intra-annular air vessel; and
   the inert gas storage bin is provided with an upper partition plate and a lower partition plate; the upper partition plate and the lower partition plate are arranged in the inert gas storage bin to divide the inert gas storage bin into an upper air vessel and a lower air vessel, the inert gas storage bin is further provided with an air inlet of the inert gas storage bin, and the air inlet of the inert gas storage bin is communicated with the upper air vessel; the upper partition plate and the lower partition plate are respectively provided with balance air holes, a piston is arranged between the upper partition plate and the lower partition plate, the piston is provided with a piston exhaust hole; and after the piston exhaust hole is communicated with the balance air holes of the upper partition plate and the lower partition plate, the upper air vessel is communicated with the lower air vessel; and one end of the upper partition plate is provided with an air leakage hole, the piston between the upper partition plate and the lower partition plate is arranged close to the air leakage hole, and one end of the piston far from the air leakage hole is provided with a spring.

2. The energy absorbing and buffering device applied to the dynamic true triaxial electromagnetic Hopkinson bar according to claim 1, wherein the piston comprises a holeless piston and a perforated piston, the perforated piston is provided with a piston exhaust hole, one end of the perforated piston is connected with the spring, and the other end of the perforated piston is connected with the holeless piston through a piston connecting bar.

3. The energy absorbing and buffering device applied to the dynamic true triaxial electromagnetic Hopkinson bar according to claim 1, wherein the energy absorbing and buffering ring further comprises an energy absorbing and buffering material, the energy absorbing and buffering material is arranged on the inert gas impact ring outer wall, and when the collided impact ring moves, the energy absorbing and buffering material is tightly contacted with the collided impact ring to slow down the movement of the collided impact ring.

4. The energy absorbing and buffering device applied to the dynamic true triaxial electromagnetic Hopkinson bar according to claim 1, wherein the hollow structures inside the collided impact ring and the inert gas impact ring outer wall are square holes.

5. The energy absorbing and buffering device applied to the dynamic true triaxial electromagnetic Hopkinson bar according to claim 1, wherein an inert gas in the inert gas storage bin is nitrogen.

6. The energy absorbing and buffering device applied to the dynamic true triaxial electromagnetic Hopkinson bar according to claim 1, wherein the energy absorbing and buffering material is made of rubber or resin material.

7. A testing and using method of an energy absorbing and buffering device applied to a dynamic true triaxial electromagnetic Hopkinson bar, wherein the energy absorbing and buffering device according to claim 1, wherein the energy absorbing and buffering device is connected with a waveguide bar through a middle hollow structure; the collided impact ring is tightly attached to a boss part of the waveguide bar, positions of the waveguide bar and the energy absorbing and buffering ring are adjusted until the rear end of the energy absorbing and buffering ring is tightly attached to the baffle at the confining pressure loading end, the position at the moment is best, and the energy absorbing and buffering ring is connected with the inert gas storage bin through the exhaust pipe; after mounting, a test is started, and an expected result is as follows: an electromagnetic emission gun inputs a stress wave into the waveguide bar through a front-end amplifier, and a reflected wave is formed when the incident wave reaches a sample boundary surface, when the reflected wave and an opposite transmitted wave reach the boss part of the waveguide bar, the boss collides the collided impact ring of the energy absorbing and buffering ring, and the collided impact ring drives the piston connecting bar and the piston part to move towards the air vessel to compress the inert gas, and discharge the compressed inert gas from the exhaust hole, the inert gas enters the external inert gas storage bin through the exhaust pipe, the inert gas storage bin is divided into two air vessels by the partition plate, the compressed inert gas first enters the upper air vessel to push a spring-piston mechanism to move until the exhaust hole reaches the position of the balance air hole, and the gas diffuses to the lower air vessel through the exhaust hole to reduce a pressure in the upper air vessel, and the spring-piston mechanism begins to reset, thus ensuring that the inert gas in the inert gas energy absorbing and buffering ring has a certain capacity.

8. The method according to claim 7, wherein after one-time use, the inert gas in the external inert gas storage bin is refilled into the gas vessel for reuse.

9. The method according to claim 7, wherein air pressures of the inert gas storage bin and the lower air vessel in the inert gas storage bin are ensured to be equal at the same time, and erection of the energy absorbing and buffering device is completed at the moment.

10. The method according to claim 7, wherein an end surface of the energy absorbing and buffering ring is tightly attached to an end surface of an outer protective frame of an electromagnetic pulse gun.

\* \* \* \* \*